United States Patent [19]

Schumacher

[11] Patent Number: 4,608,505

[45] Date of Patent: Aug. 26, 1986

[54] COMMUTATORLESS D.C. ELECTRIC MOTOR

[76] Inventor: Larry Schumacher, 18876 Tenderfoot Trail, Newhall, Calif. 91321

[21] Appl. No.: 682,890

[22] Filed: Dec. 17, 1984

[51] Int. Cl.⁴ .............................................. H02K 1/26
[52] U.S. Cl. .................................. 310/267; 310/208; 310/261
[58] Field of Search ..................... 310/67 R, 154, 156, 310/265, 267, 268, 208, 261, 46

[56] References Cited

U.S. PATENT DOCUMENTS 456,925 7/1891 Bassett ................................ 310/267
483,708 10/1892 Bassett ................................ 310/267

FOREIGN PATENT DOCUMENTS 860687 2/1961 United Kingdom ................ 310/267

Primary Examiner—Patrick R. Salce
Assistant Examiner—D. L. Rebsch
Attorney, Agent, or Firm—David O'Reilly

[57] ABSTRACT

An electromotive device which is a d.c. motor or a.c. motor, including a substantially cylindrical armature having a plurality of windings, a magnetic field of electromagnets or permanent magnets, and a casing constructed to support and maintain small air gap clearances between the armature and magnetic field. This device can be configured to provide either a stationary field commutatorless motor or a rotating magnetic field commutatorless motor. The armature is constructed to produce very small winding current magnetic flux at wide armature slot walls in comparison to winding current magnetic flux at adjacent narrow armature slot walls. The interaction of the winding current magnetic flux and the magnetic field flux induced electron motion in slot wall surfaces results in larger and oppositely directed forces at the walls of the narrow slots than at the walls of the wide slots. The net force produces a relative torque between the armature and magnetic field to drive a load attached to the motor. An advantage of a commutatorless motor constructed according to the invention is the lack of a counter-emf to limit motor speed.

25 Claims, 5 Drawing Figures

COMMUTATORLESS D.C. ELECTRIC MOTOR

FIELD OF INVENTION

The present invention relates generally to electrical motors and particularly to Direct Current (d.c.) motors.

BACKGROUND OF INVENTION

Presently all d.c. electric motors require a commutator to switch current direction as described hereinafter and examples disclosed in U.S. Pat. Nos. 3,305,740 and 3,694,041, incorporated herein by reference.

When motor fields are manufactured to produce a magnetic field in a fixed direction relative to the motor support structure, a commutator is required on the rotating element called the rotor, to switch current in the rotor fields and produce a rotor magnetic field fixed relative to the motor support structure and displaced from the magnetic field direction of the stationary fields in such a way as to produce torque on the rotor.

In the case of permanent magnet motors, the magnetic field flux is created by permanent magnets. If the permanent magnets are fixed relative to the motor structure, the commutator is required on the rotor for exactly the same reasons as described above.

If the permanent magnets are attached to the rotor, commutating mechanisms, usually electronic (brushless), are required to switch the current in the stationary fields to maintain the stationary magnetic fields in a fixed spatial orientation relative to the rotating magnetic fields produced by the permanent magnets on the rotor. The fixed spatial relationship between the rotating and fixed magnetic fields is required to produce torque on the rotor.

The consequence of the need for d.c. motor commutation depends on the type of commutation.

Mechanical commutation using carbon brushes and a segmented conductive surface on the rotor called the commutator results in the following undesirable characteristics:

1. Reduced life and increased maintenance due to brush and commutator wear
2. Radio frequency interference created by commutator arcing
3. Ripple in motor shaft torque due to commutation
4. Heat generation due to eddy currents resulting from magnetic domain rotation. Expensive motor rotor and field laminations are required to minimize eddy currents and their effects.
5. Increased cost of motor due to brushes, commutator and lamination.

Electronic (brushless) commutation used in permanent magnet motors results in the following undesirable characteristics:

1. Reduced life due to the increased number of electronic parts and complexity of the commutation scheme.
2. Ripple in motor shaft torque resulting from commutation.
3. Heat generation due to eddy currents resulting from magnetic domain rotation. Expensive motor rotor and field laminations are required to minimize eddy currents and their effects.
4. Increased cost due to switching sensors commutation electronics and laminations.

BRIEF DESCRIPTION OF THE INVENTION

This invention has many embodiments which can be broken down into two generic classes:
1. Stationary field commutatorless d.c. motors, and
2. Rotating field commutatorless d.c. motors.

Each embodiment is composed of four basic elements defined as follows:

1. Armature—This is a low magnetic reluctance annular element concentric with the motor shaft in which current carrying conductors in slots produce magnetic flux which reacts with electron motion in the armature slot walls resulting from the magnetic field flux to produce motor torque. Length is measured parallel to the motor shaft and the depth is measured radial to the motor shaft.
2. Magnetic Field—This is either a permanent magnet or electromagnet that provides magnetic flux to the magnetic circuit which includes the armature.
3. The motor casing and bearings which maintain the small air gap clearances between the rotating and stationary motor elements.
4. The motor shaft which is connected to the rotating motor element and transmits mechanical power to the motor load.

The stationary field commutatorless d.c. motor is composed of four parts. The rotating part called the armature has a narrow slot machined radial to the shaft axis in the armature leaving a web of armature material about one half slot width thick on the external cylindrical surface. The slot is widened and deepened to be greater than the winding on the planar end surfaces. The armature is supported on the motor shaft by a nonmagnetic spacer which has slots machined in the surface adjoining the armature which are extensions of the armature slots. Conductor wire as windings is wound on to rectangular winding cores the width of the narrow slots, the core and winding is equal to the combined armature and spacer slot depth, and the length of the winding core plus winding is less than the armature length. The winding cores are non magnetic except on the edge nearest the armature outer cylindrical edge which is high permeability, low reluctance material, the depth of this material is equal to the core width. The winding cores are secured in the slots provided by the armature and spacer, the individual armature windings are connected together in series-parallel combinations dependent on the desired torque and current. Current is provided to the armature windings from a controllable current source by slip rings attached to the motor shaft. The windings are connected such that the current direction in all the windings is in the same direction around the armature cross section.

The stationary magnetic field, whether a wound electromagnet or a permanent magnet, is coaxial with the motor shaft, such that it completely surrounds, and makes a small air gap with, the three exterior surfaces of the armature. The magnetic field flux of one polarity leaves the magnetic field and crosses to the unslotted, curved, exterior cylindrical armature surface across a small air gap and returns to the magnetic field of the opposite polarity at both planar slotted end surfaces of the armature cylinder across small air gaps.

The field flux causes many of the armature molecular elecron orbits in the slot walls to be oriented orthogonal to the field flux direction and the net molecular electron velocity on the slot surfaces reacts with the flux from the winding current to produce forces on the armature slot walls. The forces on the armature slot walls in the narrow slots near the exterior curved cylindrical surface of the armature are much larger and opposite in polarity to the forces on the armature slot walls of the wide slots on the planar cylinder ends. This force difference results because the winding flux density at the slot surfaces is large in the narrow slots due to a low reluctance path around the windings relative to the high reluctance flux path around the windings in the wide slots. There is negligible counter electro motive force, cemf. in the windings of this motor since very low density magnetic field flux cuts or passes through the armature winding coils.

The forces produce a torque on the rotor to drive a load which results in the motoring action.

The small air gap clearances between the armature and the stationary field both axially and radially relative to the motor shaft are maintained by the non rotating part comprising the motor casing and shaft bearings.

The rotating field commutatorless d.c. motor has a substantially cylindrical or toroidal shaped armature. The rotating magnetic field is also substantially cylindrical, one magnetic pole polarity making a small air gap with the inner cylindrical armature surface, and the other magnetic pole polarity making small air gaps at both flat armature surfaces which are orthogonal to the cylindrical axis. The magnetic field poles are separated to minimize flux leakage. The thickness of the rotating magnet between poles is substantially uniform. The rotating magnet is rigidly attached to the motor shaft at the inner cylindrical surface by a disk of nonmagnetic material.

The armature is fixed to the motor casing. Narrow slots are machined in the armature radial to the shaft axis leaving a web of armature material about one half slot width thick on the internal cylindrical surface. The slots are widened and deepened to greater than the winding dimension on the planar end surfaces. Conductor wire is wound on rectangular winding cores the width of the narrow armature slots, the width of the winding cores is greater than the armature width, and the length of the winding core plus windings is less than armature length. The winding cores are non magnetic except on the edge nearest the armature inner cylindrical edge which is high permeability, low reluctance material, the depth of this material is equal to the core width. The winding cores are secured in the armature slots. The individual armature windings are connected together in series parallel combinations dependent on the desired torque. Current is provided directly to the armature windings from a controllable current source and the armature windings are connected such that current direction in all of the armature windings is in the same circular direction around the armature cross section. Rotating magnetic field flux crosses to the armature on the interior cylindrical surface across a small air gap and crosses back to the rotating magnetic field on both planar slotted end surfaces of the armature across small air gaps. The field flux causes many of the armature molecular electron orbits in the slot walls to be oriented orthogonal to the field flux direction and the net molecular electron velocity at the slot wall surface reacts with the flux from the winding current to produce forces on the armature slot walls. The forces on the armature slot walls in the narrow slots near the interior curved cylindrical area of the armature are much larger and opposite in polarity to the forces in the armature slot walls of the wide slots on the planar cylinder ends. This force difference results because the winding flux density at the slot surfaces is large in the narrow slots due to a low reluctance path around the windings relative to the high reluctance flux path around the windings on the wide slots. There is little counter electro motive force, cemf. in the windings of this motor since very low density magnetic field flux cuts or passes through the armature windings. The forces produce a net torque on the armature and an equal but opposite reaction torque on the rotating magnetic field and motor shaft to drive a load which results in the motoring action.

The small air gap clearances between the armature and rotating field both axially and radially relative to the motor shaft are maintained by the motor casing and shaft bearings.

While the embodiment of this invention is described as a d.c. motor, if both armature and field are wound, the application of an alternating current (a.c.), to both the armature and field windings would also produce a motoring action, and in addition it is understood that the principles of this invention are applicable to other configurations of electromotive machines.

It is accordingly an object of this invention to provide an alternate and improved electromotive device. Another object of this invention is to eliminate the need for mechanical or electronic commutators and the problems and expense associated with them.

A further object of this invention is to provide a d.c. motor without torque ripple.

An additional object of this invention is to provide a d.c. motor without a requirement for periodic magnetic neutrals on the circumference of the rotating element which reduces the torque potential.

It is another object of this invention to eliminate laminated motor magnetic paths.

The above and additional objects, advantages, and features will become apparent upon consideration of the following detailed description of two specific embodiments and the accompanying drawings.

DETAILED DESCRIPTION OF INVENTION

Figure 1:
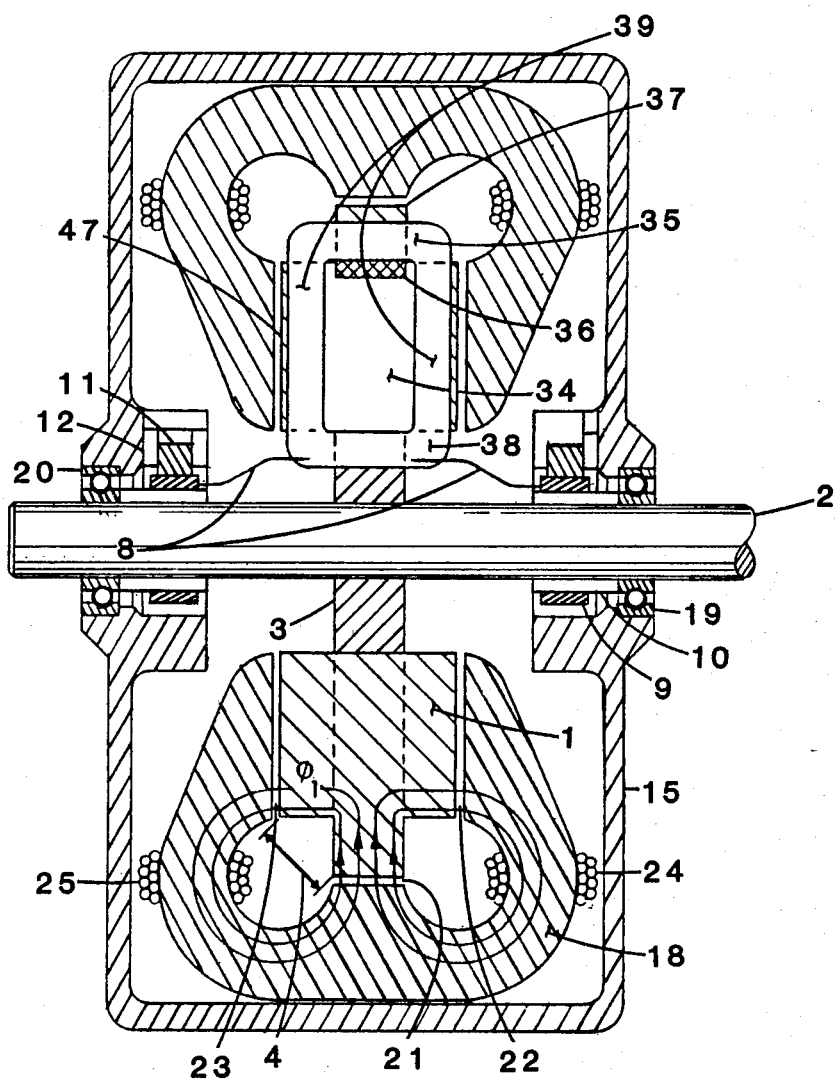
FIG. 1 is a cross-sectional view of a wound stationary field commutatorless d.c. motor with one part of the section plane through the motor shaft axis and an armature slot, and one part of the section plane through the motor shaft axis and an unslotted portion of the armature.
Figure 2:
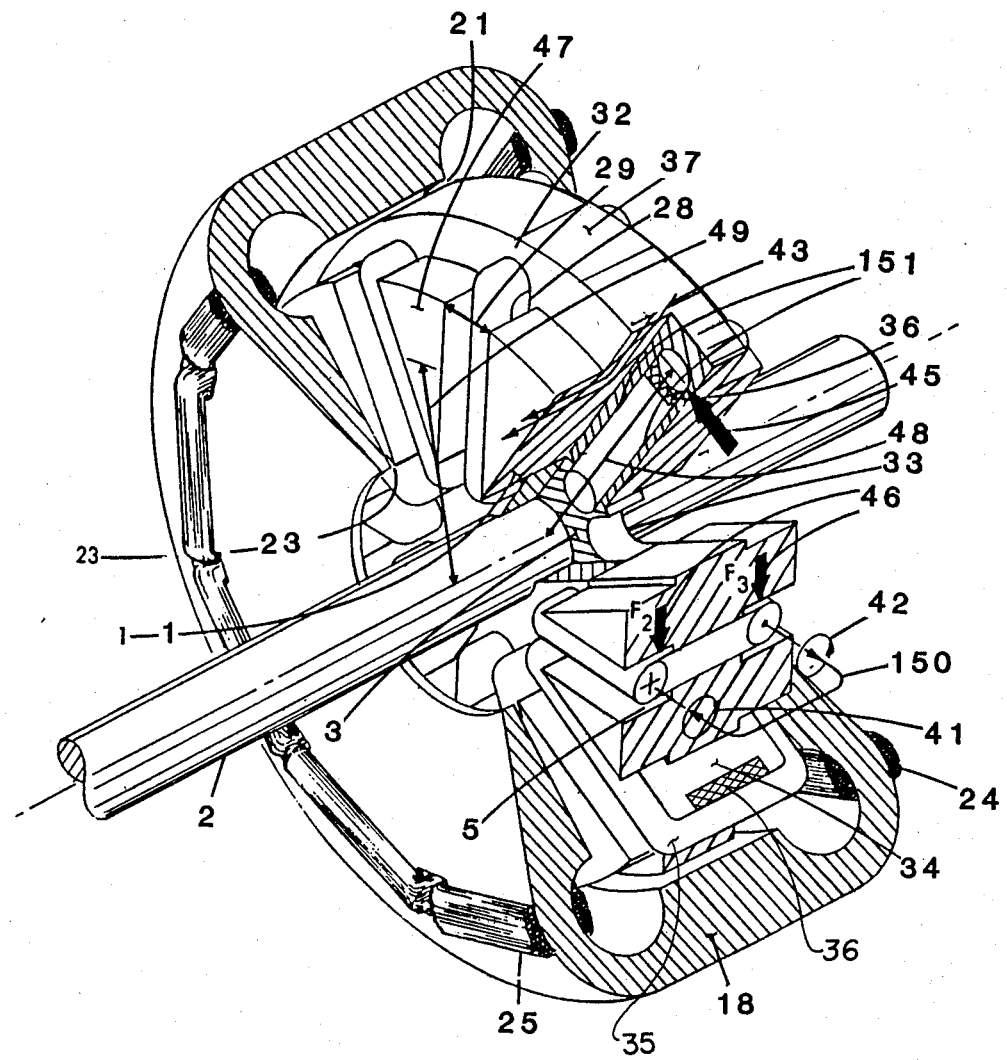
FIG. 2 is a cross-sectional view of the wound stationary field motor partially cut-away with the motor case removed for clarity.
Figure 3:
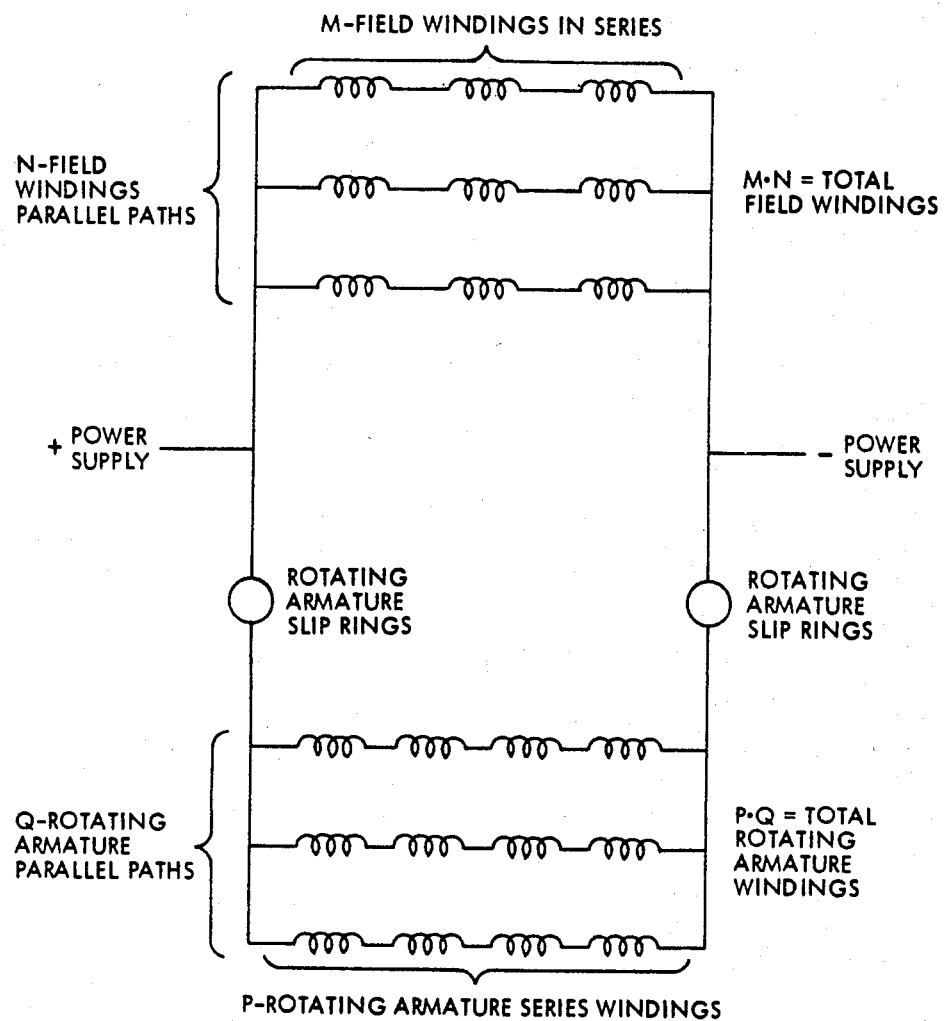
FIG. 3 is a wiring diagram of a wound stationary field motor according to the invention.

Reference is now made to FIGS. 1-3 illustrating the embodiment and the principles of a stationary field commutatorless d.c. motor according to the invention.

FIG. 1 illustrates a low reluctance substantially cylindrical armature 1 attached to the motor shaft 2 by a non-magnetic cylindrical spacer 3. Windings are attached by conductive wire 8 to slip rings 9, which area attached by insulating means 10 to the motor shaft and are linked by carbon brushes 11, secured by insulating means 12 to motor case 15 and to the external d.c. power supply (not shown).

The stationary field 18 is attached to motor case 15 which maintains its orientation relative to the motor shaft through bearings 19, 20, and motor armature 1 providing a small air gap 21 at outer peripheral surface 37 of armature 1 and air gaps 22, 23 between planar sides formed by flat end surfaces 47 of armature 1 and stationary field 18. Stationary field 18 can be a permanent magnet or a high relative permeability material wound by a plurality of windings such as 24, 25 to create a field flux $\phi_1$. The stationary field flux passes through the low reluctance path provided by armature 1 across air gaps 21, 22 and 23.

Wound on to the outer edge of rectangular winding cores 34 equal in width to narrow slots 28 (FIG. 2) in armature 1 are a number of turns of conductive wire 35 as windings. The winding core is a non-magnetic material, except for the edge-portion 36 supporting the winding in contact with the slot edge nearest the outer cylindrical surface of armature 1 which is low magnetic reluctance material. The winding core low magnetic reluctance material 36 covers an approximately square cross sectional area along the armature length and is used to reduce the winding current flux path reluctance. The wound core is secured in the narrow slots in the armature and non magnetic spacer such that the windings on the low reluctance side of the wound core are in contact with the slot edge nearest outer cylindrical edge 37 of the low reluctance armature. The windings at 38 on the opposite side are below the surface of armature 1 and extend into non-magnetic spacer material 3, and the remaining sides 39 of wound core are positioned below the plane of the flat armature end surfaces.

Flux leakage is minimized by the distance 4 between the cylindrical surface 37 and the flat end surfaces 47 (FIG. 2) where magnetic flux crosses air gaps 21, 22, 23.

FIG. 2 illustrates narrow radial slots 28 machined through armature 1 leaving a web 32 of low reluctance material having a thickness of approximately one half the slot width on the outer periphery of the substantially cylindrical armature 1. Mating slots or notches 33 are provided in non-magnetic spacer 3 to a depth of at least the width of wound conductors on core 34. Slots 29 are made in the flat end faces of armature 1 circumjacent to narrow slots 28. Slots 29 are wider and deeper than the windings on core 34.

FIG. 2 illustrates the principle of operation of the commutatorless d.c. motor. Current direction 150 in any one winding is in the same circular direction around the armature cross section and is equal in magnitude in all parts of the same winding. A current carrying winding produces a flux 41, 42 orthogonal to the current direction. This flux interacts with molecular electron orbital velocity in the slot walls. Many of the molecular electron orbits are orthogonal to the direction of the magnetic field flux 43 (i.e. $\phi_1$, FIG. 1). The interaction between the net molecular electron velocity and the winding flux produces a force 45, 46 on the slot walls which is orthogonal to both the current carrying conductor flux and the electron velocity at the slot wall surface. The magnitude of the force is proportional to the product of the magnetic field flux density in the slot walls, the flux density resulting from current in the winding at the slot wall surface, and the slot length. The flux density at the slot wall surface from the current carrying winding becomes less the more distant the winding is from the slot walls, and it is proportional to the air gap length in the slot wall surface encircling the winding. In the narrow gap the winding is very close to the armature slot surface, and the air gap at the slot surface is the sum of the two small clearances between the low reluctance material portion of the armature core at 151 and the armature slots. In the wide slots 29, the winding is separated from the slot surface by space 5 and the magnetic reluctance is increased by twice the slot width at the flat armature surface 29. Therefore current carrying windings in narrow slots 28 produce large forces on the armature indicated at F1 and the same current carrying windings in wide slots 29 on the flat armature ends produce small forces on the armature indicated at F2 and F3.

The embodiments described here have the field flux density in the armature surface area adjacent to the narrow slot walls equal to the field flux density in the flat armature end areas adjacent to the wide slots. In FIG. 2 the field flux density in the area adjacent to wide slots 29 is equal to the field flux density in the flat armature end surfaces comprising triangular areas 47.

There are no net forces on the armature produced by conductors that are not in armature slots and do not intersect flux paths. The net torque on the motor shaft results from the summation of all forces F from the narrow slots on the armature exterior cylindrical surface times the radial distance from the shaft center to the slot mean radial displacement 48 minus the summation of all forces $F_2$ and $F_3$ from the wide slots on the both flat ends of the armature cylinder times the slot mean radial displacement 49. Motor shaft torque and rotation results without any commutator to switch the direction of current in either the stationary field or the armature windings. The resulting shaft torque is smooth because of the continuous unidirectional field flux at all armature surfaces and the continuous smooth armature winding current. An additional benefit is that neither the field or armature need be laminated to reduce eddy currents because there is no rotation of magnetic domains in either the stationary field or the rotating armature as illustrated in FIG. 1 since the magnetic flux is radially and axially directed relative to the rotational shaft for all rotational positions of the armature.

There are also no perturbations of magnetic field flux due to excessive armature currents, because all the magnetic flux resulting from the armature current is confined to the low magnetic reluctance armature.

An electrical wiring diagram of the stationary field motor with wound field and rotor is shown in FIG. 3 which illustrates one arrangement of a series-parallel winding combination of the stationary field and rotor which would require a current limiting controller (not shown) which may be resistive or electronic in the armature circuit to control torque and limit speed. The number and arrangement of the serial parallel winding combination would, of course depend upon the particular application. External armature current or rotational speed control is required on this motor since there is little inherent counter electro motive force, (cemf) voltage, inherent in the commutatorless d.c. motor because of the low density magnetic field flux that cuts the armature windings. As a result of the small counter-cmf, the motor no-load speed is limited only by parasitic loads such as bearing friction and windage losses, and requires a shaft load to prevent damaging speeds.

Figure 4:
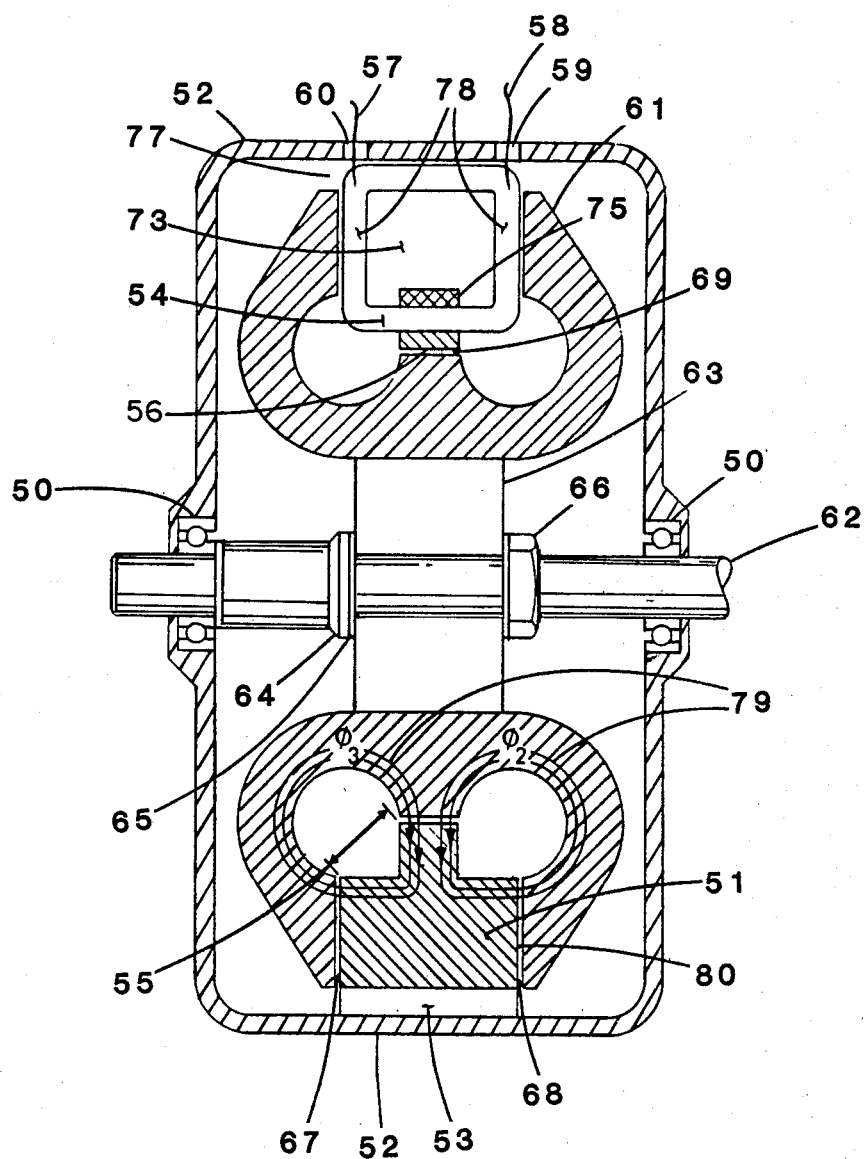
FIG. 4 is a cross-sectional view of a permanent magnet rotating field commutatorless d.c. motor with one part of the section plane through the motor shaft axis and an armature slot, and one part of the section plane through the motor shaft axis and an unslotted portion of the armature.
Figure 5:
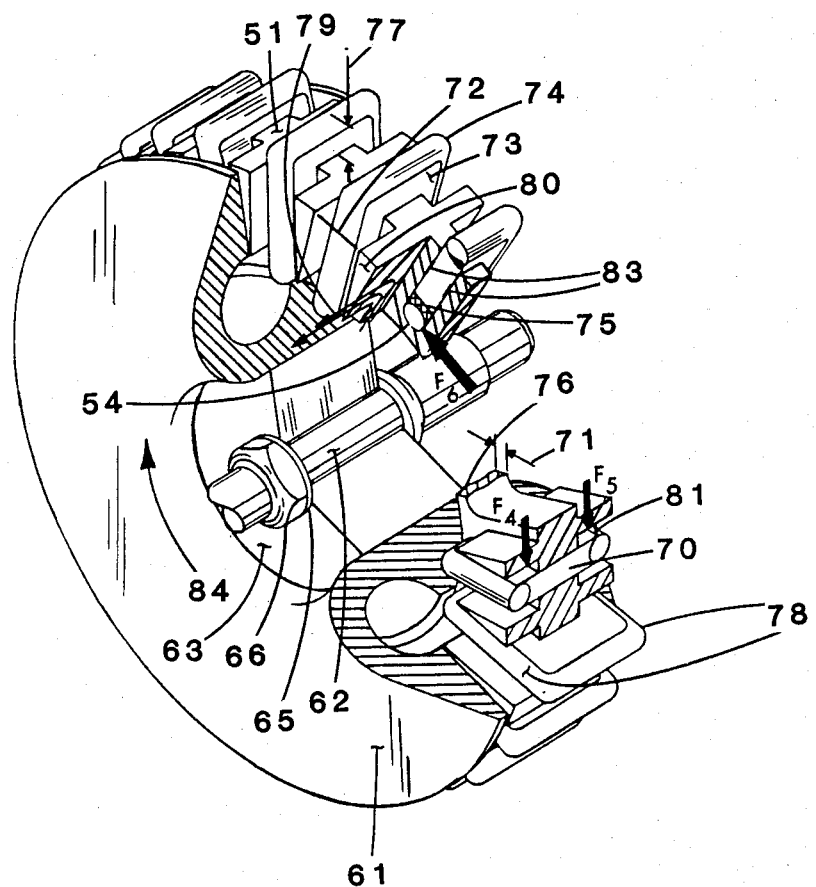
FIG. 5 is a cross-sectional view of the permanent magnet rotating field commutatorless d.c. motor partially cutaway with the motor case removed for clarity.

Reference is now made to FIGS. 4–5 illustrating one particular embodiment of the rotating field commutatorless d.c. motor.

FIG. 4 illustrates the rotating field commutatorless d.c. motor with a low reluctance substantially cylindrical armature 51 attached to the motor case 52 by non magnetic spacers 53.

The permanent magnet rotating field 61 is rigidly attached to the motor shaft 62 by non-magnetic spacer hub 63. The axial position of the rotating field is maintained by shaft stop 64 with spacers 65 and a locking nut 66 which is one possible embodiment that preserves axial air gaps 67, 68 with planar sides formed by the flat end faces 80 of cylindrical armature 51. Air gap 69 between the inside peripheral surface of armature 51 and rotating field 61 is maintained by bearings 50 and motor case 52.

Permanent magnet rotating field 61 provides field flux at $\phi_2$ and $\phi_3$ at 79. The rotating field flux enters the armature interior peripheral surface across small air gap 69 and exits the low reluctance armature across both flat slotted end faces across axial air gaps 67, 68. The magnetic flux produced by the armature windings is confined to the armature low reluctance material so that no demagnetization of the permanent magnet field can occur for large armature currents. The windings are connected together in series-parallel combinations in a manner illustrated in FIG. 3 and are attached to a d.c. power supply and armature current controller (not shown) by conductive wires 57 and 58 which enter the motor external case through conveniently provided holes 59, 60. The arrangement of the series-parallel combinations of the windings is determined according to the particular utilization of the motor.

Flux leakage is minimized by the distance 55 between the cylindrical surface 56 and the flat end surfaces 80 where magnetic flux crosses the air gaps 67, 68, 69.

In FIG. 5 narrow slots 70 are shown having a width equal to the thickness of winding cores 73 machined in armature 51 leaving a web 71 of low reluctance material having a thickness approximately equal to one half the slot width at the inner peripheral surface of the substantially cylindrical armatures. Slots 72 in the flat armature end surfaces are wider and deeper than windings on cores 73. Wound around the outer edge of rectangular non-magnetic winding cores 73 is a number of turns of conductive wire 74. Winding cores 73 are non-magnetic material except at the edge portions 75 supporting the winding which contact the armature closest to the inner peripheral surface which are of low magnetic reluctance material. Winding core low magnetic reluctance material portions 75 are approximately square in cross section along the armature length and provide a reduced winding current flux path reluctance. Winding cores 73 are secured in each narrow slot provided in the armature such that the low reluctance side of the winding core 73 and winding 74 are in contact with the slot nearest to the inner peripheral edge of the low reluctance armature at 76. The opposite side of windings 74 and core 73 extend above armature 51 into the gap between the armature and motor case at 77. The remaining two sides of winding 74 and winding cores 73 at 78 are centrally positioned in wide slots 72 below the plane of surfaces defined by the flat armature ends.

The interior cylindrical surface at the inner periphery of the armature is made approximately equal to the total area of the flat armature ends minus the areas of the slots so that flux density in the areas adjacent to all slot walls is equal. The area of flat armature end surface providing the small air gap for the magnetic field is the sum of triangular surface areas 80 on both flat end surfaces.

FIG. 5 also illustrates the principal of operation of the rotating field commutatorless d.c. motor. A current carrying winding produces a flux density orthogonal to the current direction. The magnetic field flux 79 produces molecular electron orbital velocity in the armature slot walls orthogonal to the field flux which interacts with the winding flux. The interaction produces a force on the slot walls which is orthogonal to both the current carrying winding flux and the electron velocity in the slot wall induced by the field flux. The magnitude of the force is proportional to the product of the magnetic field flux density in the slot walls, the flux density resulting from current in the winding at the slot wall, and the slot length. The flux density from the current carrying winding becomes less, the more distant the winding is from the slot walls, and it is proportional to the air gap length in the slot wall surface encircling the winding. In the narrow slot the winding is very close to the armature slot surface, and the air gap at the slot surface is the sum of two small clearances 83 between the low reluctance material 75 portion of the winding core and the armature slot. In the area of wide slots 72 winding 74 is separated from the slot surface by space 81 which reduces the winding flux at the slot surface, and the magnetic reluctance of the slot surface for winding flux is increased by twice the slot width 72 air gap in the armature 1. Therefore, current carrying windings in the narrow slots produces large forces on armature as indicated at F6 and the same current carrying winding in wide slots 72 on the flat armature end surfaces produces small forces on the armature as indicated at F4 and F5.

Forces F6, F4 and F5 do not result in rotation of the armature, but they are a convenient method of evaluating the reaction torque indicated at 84 on the rotating magnetic field since that torque is equal in magnitude but opposite in polarity to the torque produced by the armature.

This reaction torque results in magnetic field rotation without any commutator to switch current direction in the armature fields. While the rotating field illustrated in FIGS. 4 and 5 is a permanent magnet, another similar embodiment can be produced using an electromagnet rotating field supplied with current by slip rings.

While two specific embodiments of the invention are described in detail, it is apparent that variations in specific design details can be made without departing from the concept and spirit of the commutatorless d.c. motor. Therefore this invention is not to be limited by the embodiments shown in the drawings and described in the description which is given by way of example and not of limitation, but only in accordance with the scope of the appended claims.

What is claimed is:

1. An electromotive apparatus comprising:
   a case;
   a rotatable motor shaft mounted in said case;
   annular cylindrical armature means having planar sides;

annular magnetic field means circumjacent said cylindrical armature;

mounting means mounting said annular cylindrical armature means and said annular magnetic field means in said case so that one is rotatable on said motor shaft relative to the other;

said annular cylindrical armature means being constructed to have a plurality of axially planar substantially equally spaced radial extending slots;

a plurality of substantially non-magnetic cores, said non-magnetic cores being wound with wire and secured in said armature radial extending slots between said planar sides of said annular cylindrical armature;

said cores and windings having a length less than the axial length of said armature means so that said armature means extends beyond each wound core, a portion of said armature having radial extending slots adjacent to each of said cores and windings being wider than the thickness of said wound cores on either planar side of said armature means.

2. The apparatus according to claim 1 in which said mounting means comprises;

a circular disk-shaped spacer of non-magnetic material on said motor shaft providing a rotatable support.

3. The apparatus according to claim 2 in which said annular cylindrical armature means rotates and annular magnetic field means is fixed.

4. The apparatus according to claim 3 in which said annular cylindrical armature means is secured to said disk-shaped spacer for rotation with said motor shaft.

5. The apparatus according to claim 4 in which said radial extending slots extend radially outward to a point which leaves a thickness of material at an outer peripheral surface of said armature means of approximately one-half the width of said non-magnetic core.

6. The apparatus according to claim 5 in which an inner radial end of said slots extend partially into said circular disk-shaped spacer.

7. The apparatus according to claim 6 in which said slots extend into said circular disk-shaped spacer a radial distance at least equal to the depth of the wire wound on said non-magnetic cores.

8. The apparatus according to claim 2 in which said annular magnetic field means rotates and said annular cylindrical armature means is fixed.

9. The apparatus according to claim 8 in which said annular magnetic field means is secured to said disk-shaped spacer for rotation with said motor shaft.

10. The apparatus according to claim 9 in which said annular magnetic field means is an electromagnetic wound field means.

11. The apparatus according to claim 9 in whic said annular magnetic field means is a permanent magnet.

12. The apparatus according to claim 10 in which slots extend radially outward beyond said outer peripheral surface of said annular cylindrical armature means, said wound cores when mounted in said slots extending radially outward beyond said outer peripheral surface of said armature means.

13. The apparatus according to claim 12 in which said slots are constructed so that an inner peripheral thickness of material on said annular armature means is equal to about one-half of said core thickness.

14. The apparatus according to claim 13 in which said armature means is secured to said case with non-magnetic material so that there is a flux gap between the outer peripheral surface and the inner surface of said case.

15. The apparatus according to claim 14 in which the windings on said cores extend into the gap between said armature and said case.

16. The apparatus according to claim 11 in which said slots extend radially outward through said outer peripheral surface of said annular cylindrical armature means, said wound cores when mounted in said slots extending radially outward beyond said outer peripheral surface of said armature means.

17. The apparatus according to claim 16 in which said slots are constructed so that an inner peripheral thickness of material on said annular armature means is equal to about one-half of said core thickness.

18. The apparatus according to claim 1, in which the width of each of said radial extending slots on opposite planar sides of said annular cylindrical armature means is greater than the width of windings on said non-magnetic cores.

19. The apparatus according to claim 1, including means for applying a current to means rotating on said motor shaft; said means for applying current comprising slip rings.

20. The apparatus according to claim 19, in which said means for providing current to the rotating member is a pair of annular slip rings attached to the motor shaft by insulating means; said slip rings being in sliding contact with a plurality of brushes connected to a current controlled electrical power supply; said brushes being constrained from rotation by attachment to the motor case by insulating means.

21. The apparatus according to claim 1 including small air gaps between mutually facing circumjacent surfaces of said armature means and said magnetic field means where magnetic flux is required to cross.

22. The apparatus according to claim 21 in which the area of said circumjacent surfaces of said armatue means surface areas forming said small air gaps where magnetic flux crosses are constructed so that flux density in areas adjacent to all of said radial extending slot walls is equal.

23. The apparatus according to claim 1, in which said plurality of wound cores are serially connected in pre-selected groups, said pre-selected groups being connected in parallel.

24. The apparatus according to claim 1 in which an edge of said plurality of wound cores in contact with said armature means is formed of low reluctance magnetic material.

25. The apparatus according to claim 24 in which said wound core's low reluctance magnetic edge is on a side of said core nearest said cylindrical armature surface across a small air gap from one magnetic field pole.

* * * * *